US012682712B2

(12) United States Patent
Terp

(10) Patent No.: US 12,682,712 B2
(45) Date of Patent: *Jul. 14, 2026

(54) METHODS AND APPARATUS FOR ACCESSING SECURED PHYSICAL ASSETS AT A FACILITY UTILIZED FOR MAINTENANCE AND MANAGEMENT

(71) Applicant: 1Micro, LLC, Waconia, MN (US)

(72) Inventor: Jon Kristian Terp, Islamorada, FL (US)

(73) Assignee: 1MICRO, LLC, Waconia, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 19/085,882

(22) Filed: Mar. 20, 2025

(65) Prior Publication Data

US 2025/0218244 A1      Jul. 3, 2025

Related U.S. Application Data

(63) Continuation of application No. 17/872,900, filed on Jul. 25, 2022, now Pat. No. 12,283,146, which is a
(Continued)

(51) Int. Cl.
*G07C 9/21*          (2020.01)
*G06K 19/06*         (2006.01)
(Continued)

(52) U.S. Cl.
CPC ......... *G07C 9/28* (2020.01); *G06K 19/06037* (2013.01); *G07F 17/0014* (2013.01); *G07F 17/0057* (2013.01)

(58) Field of Classification Search
CPC .. G07C 9/28; G07C 9/00174; G07C 9/00698; G07C 9/21; G07C 2009/00936;
(Continued)

(56) References Cited

U.S. PATENT DOCUMENTS 5,038,023 A      8/1991  Saliga
6,170,058 B1     1/2001  Kausik
(Continued)

FOREIGN PATENT DOCUMENTS

AU          718016 B2      4/2000
AU          744133 B2      2/2002
(Continued)

OTHER PUBLICATIONS

Application and File history for U.S. Appl. No. 17/872,900, filed Jul. 25, 2022, inventors Terp (Copy not attached).
(Continued)

*Primary Examiner* — Tuyen K Vo
(74) *Attorney, Agent, or Firm* — Husch Blackwell LLC

(57) ABSTRACT

Asset access systems in accordance with various embodiments of the invention utilize a two-dimensional (2D) code that allows a user to gain physical access to and take possession of a key fob, where key fob is understood to represent any wireless device that interacts with a vehicle control system to access, manage, and operate the asset. Users of the system will present the 2D code to a transaction client that grants the user access to the key fob. Transaction clients can reside at various facilities that do not employ humans as part of the asset transfer to the user. Upon completion of the return of the asset to the facility, the user will present a new 2D code to the human-less access system that allows the user to return the key fob or other physical asset to a designated location at the transaction client.

3 Claims, 12 Drawing Sheets

Related U.S. Application Data continuation of application No. 16/881,125, filed on May 22, 2020, now Pat. No. 11,398,122, which is a continuation of application No. 15/962,282, filed on Apr. 25, 2018, now Pat. No. 10,665,047.

(60) Provisional application No. 62/491,721, filed on Apr. 28, 2017.

(51) Int. Cl.
*G07C 9/28* (2020.01)
*G07F 17/00* (2006.01)

(58) Field of Classification Search
CPC .......... G06K 19/06037; G07F 17/0014; G07F 17/0057; G06Q 20/127
See application file for complete search history.

(56) References Cited

U.S. PATENT DOCUMENTS

| | | | |
|---|---|---|---|
| 6,204,764 | B1 | 3/2001 | Maloney |
| D444,331 | S | 7/2001 | Maloney |
| D456,852 | S | 5/2002 | Maloney |
| 6,424,260 | B2 | 7/2002 | Maloney |
| 6,427,913 | B1 | 8/2002 | Maloney |
| 6,707,381 | B1 | 3/2004 | Maloney |
| 6,727,817 | B2 | 4/2004 | Maloney |
| 6,812,838 | B1 | 11/2004 | Maloney |
| 6,867,695 | B2 | 3/2005 | Prado et al. |
| 7,005,984 | B2 | 2/2006 | Maloney |
| 7,049,961 | B2 | 5/2006 | Maloney |
| D522,235 | S | 6/2006 | Kell et al. |
| 7,109,864 | B2 | 9/2006 | Maloney |
| 7,116,228 | B1 | 10/2006 | Singleton |
| 7,152,802 | B2 | 12/2006 | Kell et al. |
| 7,317,393 | B2 | 1/2008 | Maloney |
| 7,336,174 | B1 | 2/2008 | Maloney |
| 7,342,494 | B2 | 3/2008 | Maloney |
| 7,407,110 | B2 | 8/2008 | Davis et al. |
| 7,623,032 | B2 | 11/2009 | Niederland et al. |
| 7,965,190 | B2 | 6/2011 | Maloney |
| 8,103,881 | B2 | 1/2012 | Doughty et al. |
| 8,462,994 | B2 | 6/2013 | Ortiz et al. |
| 8,627,438 | B1 | 1/2014 | Bhimanaik |
| 8,653,941 | B2 | 2/2014 | Faith et al. |
| 8,844,811 | B1 | 9/2014 | Rogers et al. |
| 8,924,712 | B2 | 12/2014 | Varadarajan et al. |
| 9,272,058 | B1 | 3/2016 | Montgomery |
| 9,364,573 | B2 | 6/2016 | Deshays et al. |
| 9,443,365 | B2 | 9/2016 | Ahearn et al. |
| 9,479,339 | B2 | 10/2016 | Bender et al. |
| 9,483,631 | B2 | 11/2016 | Lowe |
| 9,503,260 | B2 | 11/2016 | Brands |
| 9,508,207 | B2 | 11/2016 | Kalb et al. |
| 9,514,589 | B2 | 12/2016 | Raina et al. |
| 9,520,939 | B2 | 12/2016 | Jovicic et al. |
| 9,524,502 | B2 | 12/2016 | Rajan et al. |
| 9,544,853 | B1 | 1/2017 | Gu et al. |
| 9,548,982 | B1 | 1/2017 | Karunakaran et al. |
| 9,552,466 | B2 | 1/2017 | Lowe |
| 9,554,267 | B2 | 1/2017 | Kim et al. |
| 9,554,277 | B2 | 1/2017 | G et al. |
| 9,554,279 | B1 | 1/2017 | Kremer et al. |
| 9,563,908 | B2 | 2/2017 | Shanker et al. |
| 9,565,530 | B2 | 2/2017 | Edge et al. |
| 9,576,255 | B2 | 2/2017 | Kalb et al. |
| 9,582,949 | B2 | 2/2017 | Brown et al. |
| 9,590,968 | B2 | 3/2017 | Stollman |
| 9,640,002 | B1 | 5/2017 | Grosberg |
| 9,675,720 | B2 | 6/2017 | Romo et al. |
| 9,730,065 | B1 | 8/2017 | Chen |
| 9,745,130 | B1 | 8/2017 | Rawal |
| 9,832,019 | B2 | 11/2017 | Choi |
| 9,875,590 | B2 | 1/2018 | Schmidt-Lackner et al. |
| 9,904,800 | B2 | 2/2018 | Spodak et al. |
| 9,954,835 | B2 | 4/2018 | Brown et al. |
| 9,972,144 | B2 | 5/2018 | Klein et al. |
| 10,111,976 | B2 | 10/2018 | Deshays et al. |
| 10,198,887 | B2 | 2/2019 | Ogishi et al. |
| 10,198,888 | B2 | 2/2019 | Brockman et al. |
| 10,229,408 | B2 | 3/2019 | Gardiner et al. |
| 10,265,540 | B2 | 4/2019 | Yehezkel |
| 10,275,758 | B2 | 4/2019 | Lund |
| 10,310,500 | B1 | 6/2019 | Brady et al. |
| 10,568,981 | B2 | 2/2020 | Lyslo et al. |
| 10,614,649 | B2 | 4/2020 | Brockman et al. |
| 10,656,280 | B2 | 5/2020 | Cooper et al. |
| 10,665,047 | B1 | 5/2020 | Terp |
| 11,398,122 | B2 | 7/2022 | Terp |
| 2003/0030011 | A1 | 2/2003 | Brown et al. |
| 2004/0111323 | A1 | 6/2004 | Niederland et al. |
| 2004/0225954 | A1 | 11/2004 | Maloney |
| 2004/0229560 | A1 | 11/2004 | Maloney |
| 2005/0179547 | A1 | 8/2005 | Maloney |
| 2007/0093215 | A1 | 4/2007 | Mervine |
| 2008/0186130 | A1 | 8/2008 | Trevino et al. |
| 2009/0153291 | A1 | 6/2009 | Larson et al. |
| 2009/0237203 | A1 | 9/2009 | Determan |
| 2011/0307375 | A1 | 12/2011 | Maney |
| 2011/0313937 | A1 | 12/2011 | Moore, Jr. et al. |
| 2012/0153783 | A1 | 6/2012 | Shoenfeld |
| 2013/0261792 | A1 | 10/2013 | Gupta et al. |
| 2015/0007619 | A1 | 1/2015 | Finney et al. |
| 2015/0185734 | A1 | 7/2015 | Minoiu-Enache |
| 2015/0356801 | A1 | 12/2015 | Nitu et al. |
| 2016/0027307 | A1 | 1/2016 | Abhyanker et al. |
| 2016/0140649 | A1 | 5/2016 | Kleve et al. |
| 2016/0171435 | A1 | 6/2016 | Newton et al. |
| 2016/0358186 | A1 | 12/2016 | Radocchia et al. |
| 2017/0203857 | A1 | 7/2017 | O'Toole |
| 2017/0262789 | A1 | 9/2017 | Zhang et al. |
| 2017/0337507 | A1 | 11/2017 | Curry et al. |
| 2018/0108024 | A1 | 4/2018 | Greco et al. |
| 2018/0165655 | A1 | 6/2018 | Marcelle |
| 2019/0076558 | A1 | 3/2019 | Zhang-Miske et al. |
| 2020/0162463 | A1 | 5/2020 | Dykstra et al. |
| 2021/0012602 | A1 | 1/2021 | Terp |
| 2021/0398372 | A1 | 12/2021 | Terp |

FOREIGN PATENT DOCUMENTS

| | | | |
|---|---|---|---|
| AU | 2003271978 | | 3/2005 |
| AU | 2011265760 | | 12/2011 |
| AU | 2020200705 | A1 | 2/2020 |
| CA | 2307939 | C | 5/2003 |
| CA | 2665270 | | 5/2008 |
| CA | 2733365 | A1 | 9/2011 |
| CA | 2955282 | A1 | 1/2012 |
| CA | 2988318 | A1 | 12/2016 |
| CN | 100477578 | C | 4/2009 |
| CN | 102714591 | A | 10/2012 |
| CN | 102918550 | A | 2/2013 |
| CN | 105913132 | | 2/2020 |
| DE | 69625083 | | 2/2004 |
| EP | 1028385 | A2 | 8/2000 |
| EP | 3579524 | B1 | 9/2020 |
| EP | 3742407 | A1 | 11/2020 |
| EP | 2355050 | A3 | 3/2021 |
| ES | 2444650 | | 3/2018 |
| JP | 2020166899 | A | 10/2020 |
| KR | 102047493 | B1 | 11/2019 |
| RU | 2394275 | | 7/2010 |
| TW | I430118 | U | 3/2014 |
| WO | 2019084203 | A1 | 5/2019 |

OTHER PUBLICATIONS

Application and File history for U.S. Appl. No. 16/881,125, filed May 22, 2020, inventors Terp (Copy not attached).

Application and File history for U.S. Appl. No. 15/962,282, filed Apr. 25, 2018, inventors Terp (Copy not attached).

(56) References Cited

OTHER PUBLICATIONS

Webpage, 1 Micro, "Mobile Transactions, Automotive Mobile Key Managemenet," 1 Micro, LLC, https://web.archive.org/web/20190412033703/http://www.1micro.com/ilottransactions.

KeyTrak, Inc. / Key Control Holding, Inc., "p. 1—Patent Portfolio," 1 page.

KeyTrak, Inc. / Key Control Holding, Inc., "p. 2—Patent Portfolio," 1 page.

(prior art)

(prior art)

METHODS AND APPARATUS FOR ACCESSING SECURED PHYSICAL ASSETS AT A FACILITY UTILIZED FOR MAINTENANCE AND MANAGEMENT

RELATED APPLICATIONS

The present application is a continuation of U.S. patent application Ser. No. 17/872,900, entitled "METHODS AND APPARATUS FOR ACCESSING SECURED PHYSICAL ASSETS AT A FACILITY UTILIZED FOR MAINTE-NANCE AND MANAGEMENT", filed Jul. 25, 2022, which is a continuation of U.S. patent application Ser. No. 16/881,125, entitled "PASSENGER AUTHENTICATION SYSTEM FOR A TRANSPORTATION SERVICE VEHICLE", filed May 22, 2020, now U.S. Pat. No. 11,398, 122 issued Jul. 26, 2022, which is a continuation of U.S. patent application Ser. No. 15/962,282, entitled "METH-ODS AND APPARATUS FOR ACCESSING SECURED PHYSICAL ASSETS", filed Apr. 25, 2018, now U.S. Pat. No. 10,665,047 issued May 26, 2020, which claims the benefit of U.S. Provisional Application No. 62/491,721, entitled "METHODS AND APPARATUS FOR ACCESS-ING SECURED PHYSICAL ASSETS", filed Apr. 28, 2017, all of which are hereby incorporated by reference in their entirety.

TECHNICAL FIELD

Embodiments relate generally to users of physical assets gaining access to said assets for the desired use without the need for dedicated hardware or software. More particularly, embodiments relate to a system for allowing users to gain access to physical assets with the use of a mobile communication device.

BACKGROUND OF THE INVENTION

User access to physical assets is a growing need in commerce. The mobility economy is being shaped by lower levels of ownership of physical assets. Personal transporta-tion is being shaped and will continue to evolve into lower levels of vehicle ownership, with passengers gaining access to ride sharing or mobility assets by utilizing their mobile devices to schedule and dispatch mobility assets. Users of mobility services still require physical exchange of infor-mation between the human driver and passenger in order for the passenger to access the mobility service. The advent of SAE level 5 autonomous vehicles will drive further advancements in personal transportation when mobility pro-viders utilize driverless vehicles on private and public roadways. Advancements in personal access to these driv-erless mobility services will be needed.

Transformations in the delivery of goods will drive the need for innovation in access. Presently, the package deliv-ery industry relies on physical or electronic signatures to validate the delivery of certain parcels. Companies like Federal Express and United Parcel Service have made innovations in the dedicated hardware and software needed to collect signatures from parcel recipients and rapidly track the transfer of goods through their logistics systems. The physical transfer of goods, however, still requires the human parcel deliverer and the recipient to interact via the use of the dedicated hardware platform for collecting and routing signature information and the subsequent transfer of pos-session. Federal Express, UPS, and Amazon are making rapid advances in the automated delivery of packages. The use of short-range Unmanned Aerial Vehicles (UAVs) is being utilized for package delivery with rapidly-growing success. These companies are likely heading toward utiliz-ing driverless over-the-road vehicles for package delivery in the not-too-distant future. One of these weaknesses of these driverless and pilotless systems is their inability to replicate the deliverer-to-receiver interface for collecting and process-ing signatures to validate the receipt of the package and the transfer of possession. Advancements in logistics are required when the human is eliminated from the delivery side of the transaction.

Real estate owners will gain access to their homes or commercial properties via physical interfaces like keys and locks or access cards and cards readers, typically in concert with password-required access to a security system for the enablement and disablement of the security features. Tem-porary users of real estate, in order to gain access to the asset, will need to acquire the key or access card from the owner via a physical interaction or through a lockbox. Both of these methods require a dedicated physical component and a means to gain access to the physical component. Advancements in access protocol are needed to allow broader access to physical real estate assets without human interaction and without the need for application-specific hardware.

Vehicle owners will gain access to their possessions via interfaces like keys and locks or key fobs and fob readers. Temporary users of vehicles, in order to gain access to the asset, will need to acquire the key or fob from the owner via a physical interaction or through a lockbox. Both of these methods require a dedicated physical component and a means to gain access to the physical component. Advance-ments in access protocol are needed to allow broader access to physical vehicle assets without human interaction and without the need for application-specific hardware.

According to several sources in the access and authenti-cation market, there is a trend moving away from authen-tication schemes relying on 'what is known', such as a password, to 'what is present', such as a key fob or finger-print. With passwords being such a major culprit in hacking schemes, 'what is present' authentication factors are fast becoming much more relevant. Due to their features, mobile communication devices can provide a useful 'what is pres-ent' authentication factor. They can be used for second-factor authentication, or can replace 'what is known' factors (passwords) completely as a single-factor authentication device.

Several methods and systems are available in the art that attempt to provide access to systems or data with the use of mobile communication devices. U.S. Pat. No. 9,576,255 provides controlled access to events, premises, transporta-tion, and the like by providing a ticket to a ticket holder by defining rights associated with the ticket, determining the device to be associated with the ticket, creating a link that represents the ticket, providing the link to the ticket holder, and providing a charge to the ticket based on the geographic location of the associated device. U.S. Pat. No. 9,565,530 teaches techniques for allowing a mobile device to obtain access to location services from one or more computing devices that have been authorized for use.

U.S. Pat. No. 9,563,908 teaches a system that utilizes a circuit to receive transaction data and produce transaction summary files for the purchase of software applications. U.S. Pat. No. 9,554,279 teaches a system of one or more mobile devices for accessing secure data where the devices include circuitry for a passcode scanner that scans for the user currently using each mobile device connected to a secure network where the mobile device contains an access requestor and the server validates an authorized area of authentication.

U.S. Pat. No. 9,554,279 teaches a system of one or more mobile devices for accessing secure data where the devices include circuitry for a passcode scanner that scans for the user currently using each mobile device connected to a secure network where the mobile device contains an access requestor and the server validates an authorized area of authentication. U.S. Pat. No. 9,554,277 teaches a method for managing access rights by receiving, via a mobile device, information from a passive tag located at an entrance to an area, wherein the information includes identification information for the entrance.

U.S. Pat. No. 9,554,267 teaches a processor circuit on a server configured to receive a data packet request from an entity that provides an online service to a mobile device, the data packet request comprising a network identifier for the mobile device. U.S. Pat. No. 9,552,466 teaches a physical access control system protecting a secure asset that uses wireless communication between a reader of the physical access control system and a mobile device to establish the proximity of the mobile device to the reader and establishes a credential at the mobile device for operating the physical access point. In a subsequent transaction, the system generates a second credential at the mobile device that is different from the first credential.

U.S. Pat. No. 9,548,982 describes a memory and processor system that utilizes a mobile device to authenticate access to a service by performing authentication via a proxy server. U.S. Pat. No. 9,544,853 teaches a vehicle communication and access system with a previously paired mobile device and a vehicle near field communication (NFC) device coupled to the control unit. The system utilizes wireless communications to establish if the mobile device is at or below the threshold battery power level.

U.S. Pat. No. 9,524,502 describes an apparatus that manages mobile coupons with wireless communication between a mobile coupon application on a mobile device and a coupon management module configured to provide an indication of an impending change at the user interface. U.S. Pat. No. 9,520,939 teaches an access authorization device used to control access to an area by utilizing a sequence of hash values and a means for determining if the first hashed value was generated from a mobile wireless communications device authorized to control the access device. The access device then sends an access command to the mobile device to authorize control of the system by the mobile device.

U.S. Pat. No. 9,514,589 describes a secure short-distance-based communication and access control system to a restricted area whereby the sub-locations of the access control area have physical barriers and at least one beacon for each sub-location. The system authenticates mobile devices that are approved for access and validates, via the location beacons, whether the approved device is in the sub-location. Having validated the device and the location, the system energizes an actuator driver circuit to invoke the opening or closing of the physical barrier for the sub-location. U.S. Pat. No. 9,508,207 teaches a method of providing access to a premises by creating a credential to be used to unlock an access control device, identifying a device to be used to present the credential to the access control device, defining a dynamic link to provide the credential to the device, enabling the dynamic link by activating the link so that it is a valid link, presenting the credential to the access control device and to the identified device via the dynamic link, and unlocking the access control device when the credential is presented by the identified device.

U.S. Pat. No. 9,503,260 teaches a security token configured to facilitate access to a remote computing service via a mobile device external to the security token by use of a Near Field Communication (NFC) interface, a smart card integrated circuit, and a smart card applet stored in and executable by the smart card integrated circuit, wherein the smart card applet is configured to support a cryptographic challenge-response protocol executable by the mobile device, wherein a plurality of credentials for the cryptographic challenge-response protocol are maintained inside a single security token. U.S. Pat. No. 9,483,631 describes a reader of a physical access control system associated with a physical access point of a secure asset, wherein the reader is configured to perform operations of transmitting an interrogating radio frequency (RF) signal to a mobile device comprising a first credential that is unique to the reader. Furthermore, the system receives, from the mobile device, an RF response to the interrogating RF signal with a second credential that is unique to the mobile device, and controls the physical access point to permit or deny a holder of the mobile device access to the secure asset based on the RF response to the interrogating RF signal.

U.S. Pat. No. 9,479,339 teaches a method performed by a host server of instructing a mobile communication device to obtain a digital certificate from a certificate authority. The method further instructs receiving a signed certificate request message that contains a public key generated by the mobile communication device, the certificate request message having been signed with a private key generated by the mobile communication device, with the public key and the private key forming a public-private key pair. Lastly, the method concludes by obtaining a digital certificate signed by the certificate authority and pushing the digital certificate to the mobile communication device. U.S. Pat. No. 9,443,365 teaches a method for utilizing Bluetooth communication between a mobile device and a reader device in response to the mobile device being in a connection zone relative to the reader device. The method includes the capability of the mobile device to sense velocity, acceleration and GPS location information for the device to determine if the mobile device is in the activation zone of the reader device.

U.S. Pat. No. 8,924,712 teaches a method for authenticating a transaction by reading an image comprising a matrix barcode encoded with transaction information that is displayed on a display of an external device using a mobile device associated with a user authorized to access a secure resource. The transaction method includes recovering a first seed key from two or more seed keys stored on a memory of the mobile device and establishing the identity of the merchant associated with the transaction. Lastly, the method transmits a password generated with the recovered seed key from the mobile device to an authentication system. U.S. Pat. No. 6,170,058 describes an apparatus for managing access to a cryptographically secured access-controlled datum and a computer-implemented output logic means for providing said processed access-controlled datum to a user of said apparatus.

U.S. Pat. No. 8,627,438 teaches a computer-implemented method of authenticating a customer using a trusted device by registering a mobile device as a trusted device associated with a customer account for an online resource and providing a graphical code for display by the electronic device. The identification of the mobile device as the trusted device associated with the customer account occurs via marking the security token included in the graphical code and authenticating the data indicating that the graphical code was captured from a mobile device. Lastly the mobile device is automatically signed in through the means of a hardware processor.

Asset access systems have the potential to be utilized extensively in systems where the owner of the asset does not have a human involved in the transaction. However, the need for dedicated hardware on the part of the user of the service or system will limit the widespread deployment of these asset access systems. A need exists for a non-hardware-specific system that allows users to gain access to physical assets and complete transactions for these human-less asset management and access systems.

SUMMARY OF THE INVENTION

Asset access systems in accordance with various embodiments of the invention utilize a two-dimensional (2D) code that allows a user to gain physical access to and take possession of a key fob, where key fob is understood to represent any wireless device that interacts with a vehicle control system to access, manage and operate the asset. Users of the system will present the 2D code to a transaction client that grants the user access to the key fob. Transaction clients can reside at various facilities that do not employ humans as part of the asset transfer to the user. Automated transaction clients can reside at facilities that include, but are not limited to, automobile rental facilities, new and used vehicle acquisition facilities, vehicle parking facilities, aircraft storage and rental facilities, spacecraft storage and rental facilities, Unmanned Aerial Vehicle (UAV) storage or rental facilities, Unmanned Underwater Vessel (UUV) storage or rental facilities, bank ATMs, vending machines, school, hospital or gym lockers, social media login sites, hotel room doors, and government vehicle, weapon or facility access. Upon completion of the return of the asset to the facility, the user will present a new 2D code to the human-less access system that allows the user to return the key fob or other physical asset to a designated location at the transaction client.

Asset access systems in accordance with various embodiments of the invention utilize a 2D code that allows a user to gain physical access to and take possession of a key for accessing real estate. Users of the system will present the 2D code to a transaction client that grants the user access to the key. Transaction clients can replace traditional lock boxes that have historically been used to allow potential real estate buyers or renters to tour target properties without the presence of a listing agent. Upon completion of the tour of the property by the potential buyer or renter, the user will present a new 2D code to the human-less access system that allows the user to return the key to a designated location at the transaction client.

Asset access systems in accordance with various embodiments of the invention utilize a 2D code that allows a user to gain physical access to and take possession of a package that is delivered by a drone or other UAV. Many packages delivered by popular delivery services do not require recipient signatures for the completion of the transfer of possession. Other packages, however, do require signatures or other authentication by the package recipient in order to complete the delivery transaction. For these authenticated deliveries via UAV in accordance with various embodiments, the delivery UAV will have a transaction client that will process the 2D code and deliver the appropriate payload to the transacted user. The presence of the transaction client on the UAV allows the delivery service to broaden the scope of their deliveries by including all packages that meet the payload and range requirements. Systems without a transaction client will be relegated to delivering only packages that do not require a signature or other delivery authentication.

Asset access systems in accordance with various embodiments of the invention utilize a 2D code that allows a user to gain physical access to and take possession of a package that is delivered by a driverless over-the-road vehicle. Many packages delivered by popular delivery services do not require recipient signatures for the completion of the transfer of possession. Other packages, however, do require signatures or other authentication by the package recipient in order to complete the delivery transaction. For these authenticated deliveries via driverless over-the-road vehicles in accordance with various embodiments, the delivery vehicle will have a transaction client that will process the 2D code and allow the user to gain physical access to the area or compartment that contains the to-be-delivered package. The presence of the transaction client on the driverless over-the-road vehicle allows the delivery service to broaden the scope of their deliveries by including all packages that meet the payload and range requirements. Systems without a transaction client will be relegated to delivering only packages that do not require a signature or other delivery authentication.

Asset access systems in accordance with various embodiments of the invention utilize a 2D code that allows a user to gain access to a mobility service that is delivered by a driverless over-the-road vehicle. Driver-based mobility services today may include the use of vehicles supplied by, but are not limited to, taxis, chauffeurs, limousines, ride-sharing services, and popular mobility providers like Uber and Lyft. User access to these driver-based services requires some type of physical interaction between the vehicle operator and the user in order to authenticate the transaction and/or allow user access to the mobility service. For this authenticated access to mobility via driverless over-the-road vehicles in accordance with various embodiments, the mobility vehicle will have a transaction client that will process the 2D code and allow the user to gain physical access to the vehicle. The presence of the transaction client on the driverless over-the-road vehicle allows the mobility service to deploy truly human-less mobility. Systems without a transaction client will be relegated to requiring some type of human interaction on the part of the service in order to authenticate the access to the service.

DETAILED DESCRIPTION OF THE DRAWINGS

Figure 1:
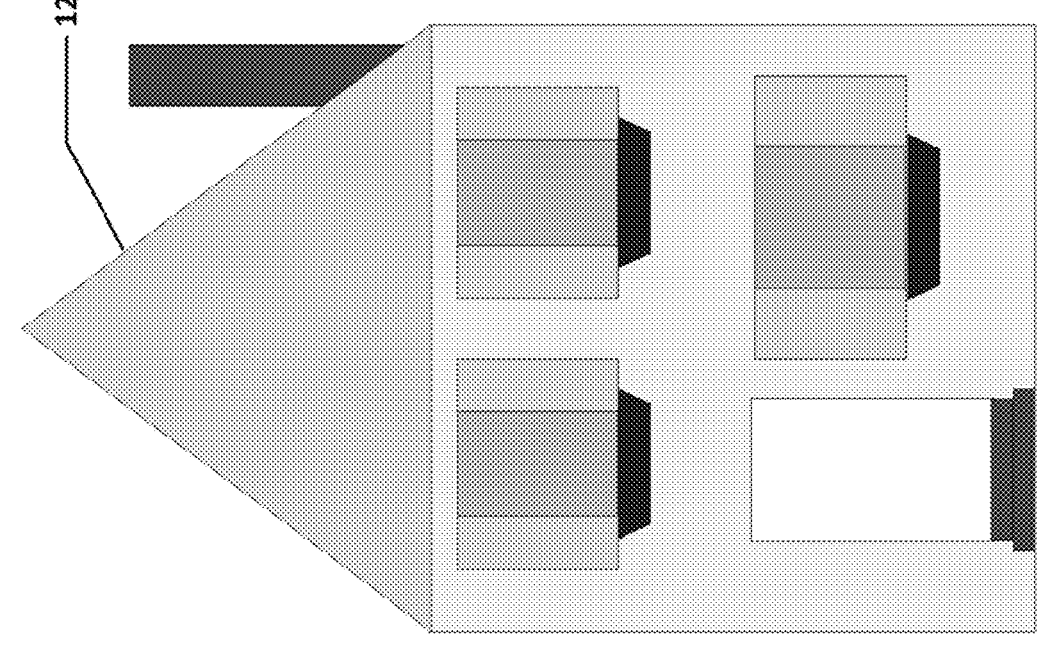
FIG. 1 illustrates access to real estate by a property owner.
Figure 1:
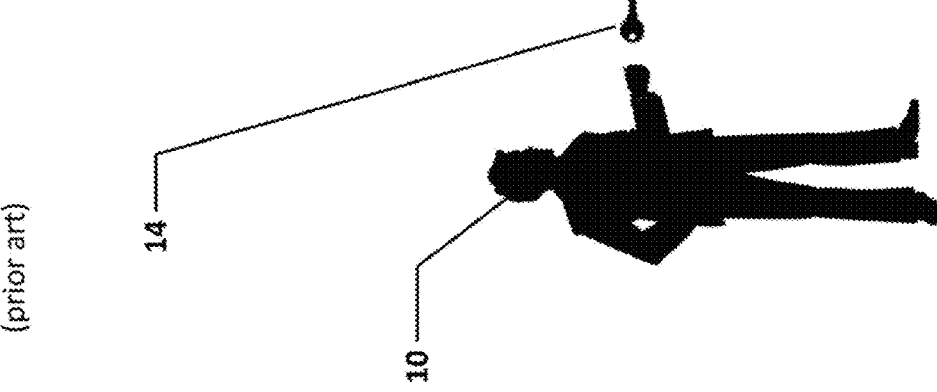

Non-human-controlled access to physical assets occurs in many forms today. These access systems typically rely on little or no technology. FIG. 1 shows a typical application of a simple asset access system. An owner 10 of a property 12 locks the entrance to the structure when nobody is residing in the structure. In order to gain access to the property 12, the owner 10 utilizes a mechanical tool like a key 14 as a device to unlock the entrance to the property. Only inhabitants of the property will typically possess keys 14, thus limiting access to the property 12.

Figure 2:
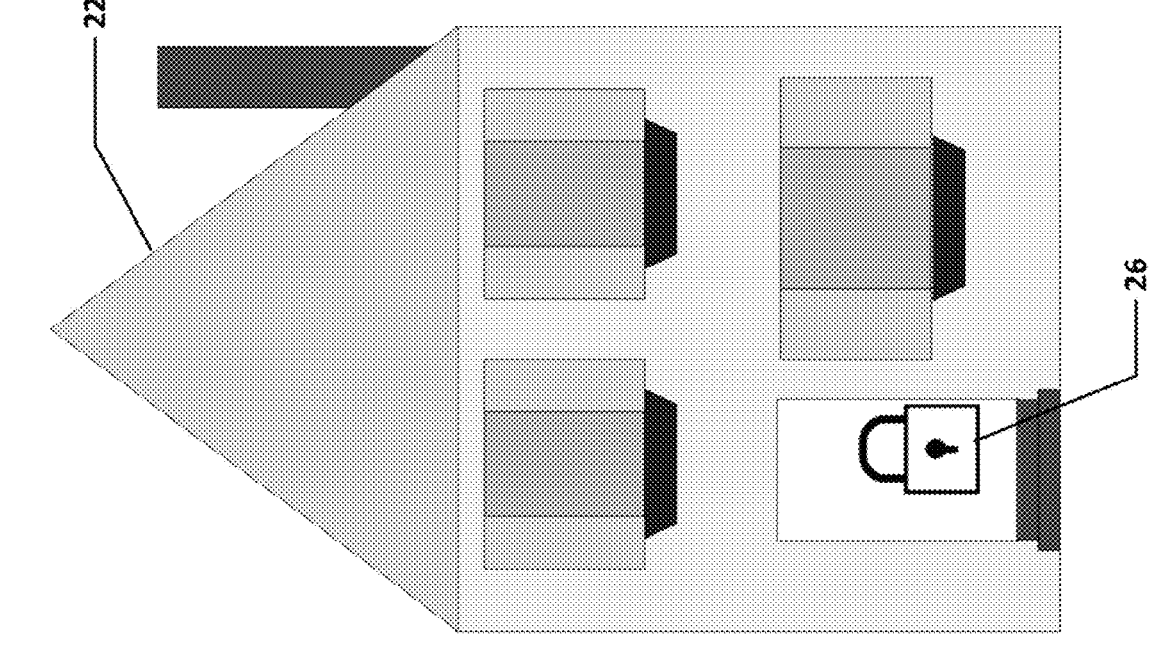
FIG. 2 illustrates access to real estate by a non-owner through the use of a remote access system.
Figure 2:
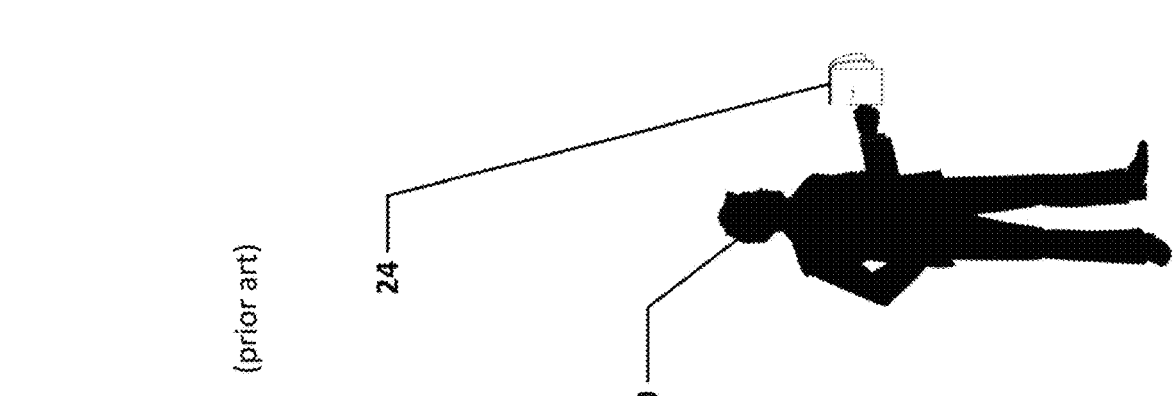

FIG. 2 shows a property 22 that is enabled to grant access to users 20 by way of a lock box 26 connected to the structure entrance. Properties 22 with lock boxes 26 are typically made available to potential renters of listed rental properties 22 or to potential buyers of properties 22 that are for sale. Lock box 26 access systems are utilized in scenarios when a listing agent or other representative is not present at the property 22 in order to grant access to the would-be renter 20 or buyer 20. Lock box 26 access is typically granted by having the user 20 enter an access code at the device 26, thus unlocking the compartment that contains the key to be utilized to unlock the entrance to the property 22. User's 20 will typically write the access code on a piece of paper 24 or locate the access information in another less-than-secure manner. When properties 22 have multiple viewers 20 of a single property 22, all entrants will typically utilize the same access code. The utilization of lock box 26 systems like that shown make the property 22 vulnerable to theft or vandalism should the access code fall into the wrong hands. By utilizing a single access code for multiple users 20, the lock box 26 system makes it difficult to track which possessors of the code actually accessed the property and render any damages to the property untraceable.

Figure 3:
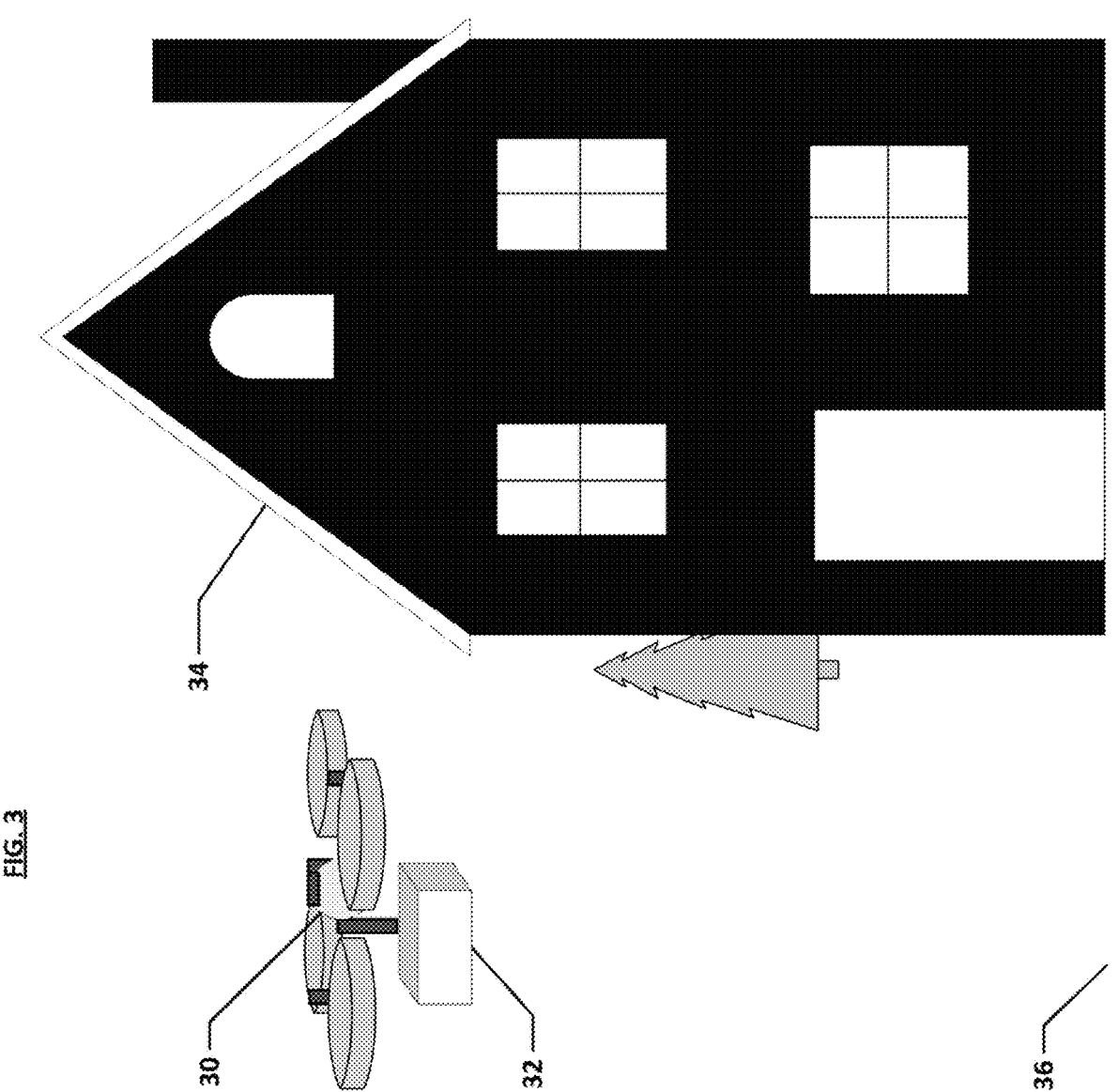
FIG. 3 illustrates a transaction for transferring possession of a delivered package.

FIG. 3 shows a scenario that is rapidly gaining popularity in the logistics business. A drone 30 or other UAV delivers a package 32 to a residence 34 by placing the package 32 at a designated area 36 near the residence 34. This delivery method will gain significant popularity for light-payload, short-range deliveries that don't require a human interface on the receiver side of the transaction. Unfortunately, many deliveries still require a signature by the recipient or some other validation produced by the acceptor of the package 32 that a valid transfer of possession has occurred.

Figure 4:
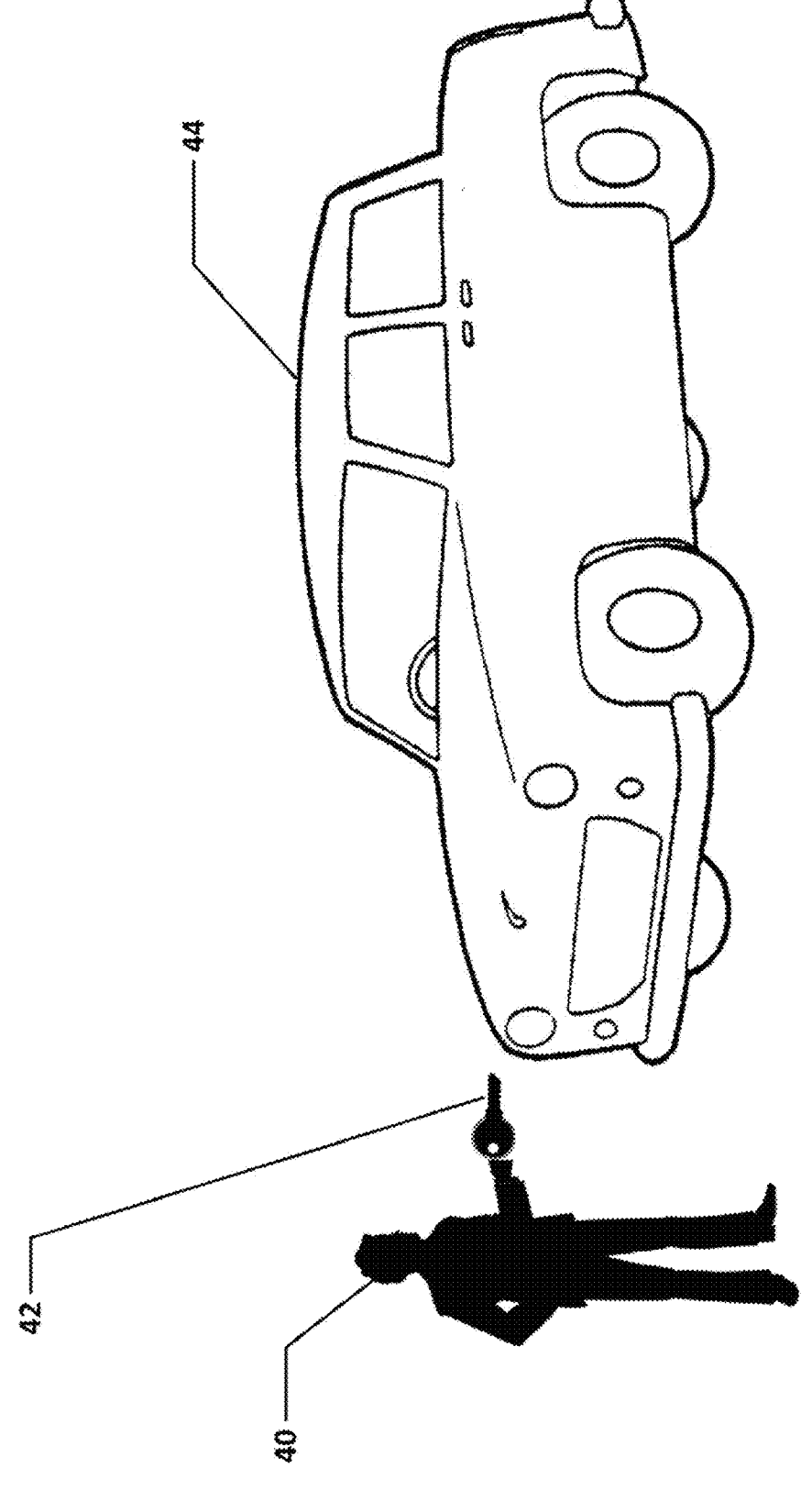
FIG. 4 illustrates access to a vehicle by an owner.

FIG. 4 shows a typical application of a simple asset access system. An owner 40 of a vehicle 44 locks the access points to the vehicle 44 when it is not in use. In order to gain access to the vehicle 44, the owner 40 utilizes a mechanical tool like a key 42 or an electronic device like a key fob as a means to unlock the access point to the vehicle 44. Only owners 40 of the vehicle 44 will typically possess keys 14 or key fobs, thus limiting access to the vehicle 44.

Figure 5:
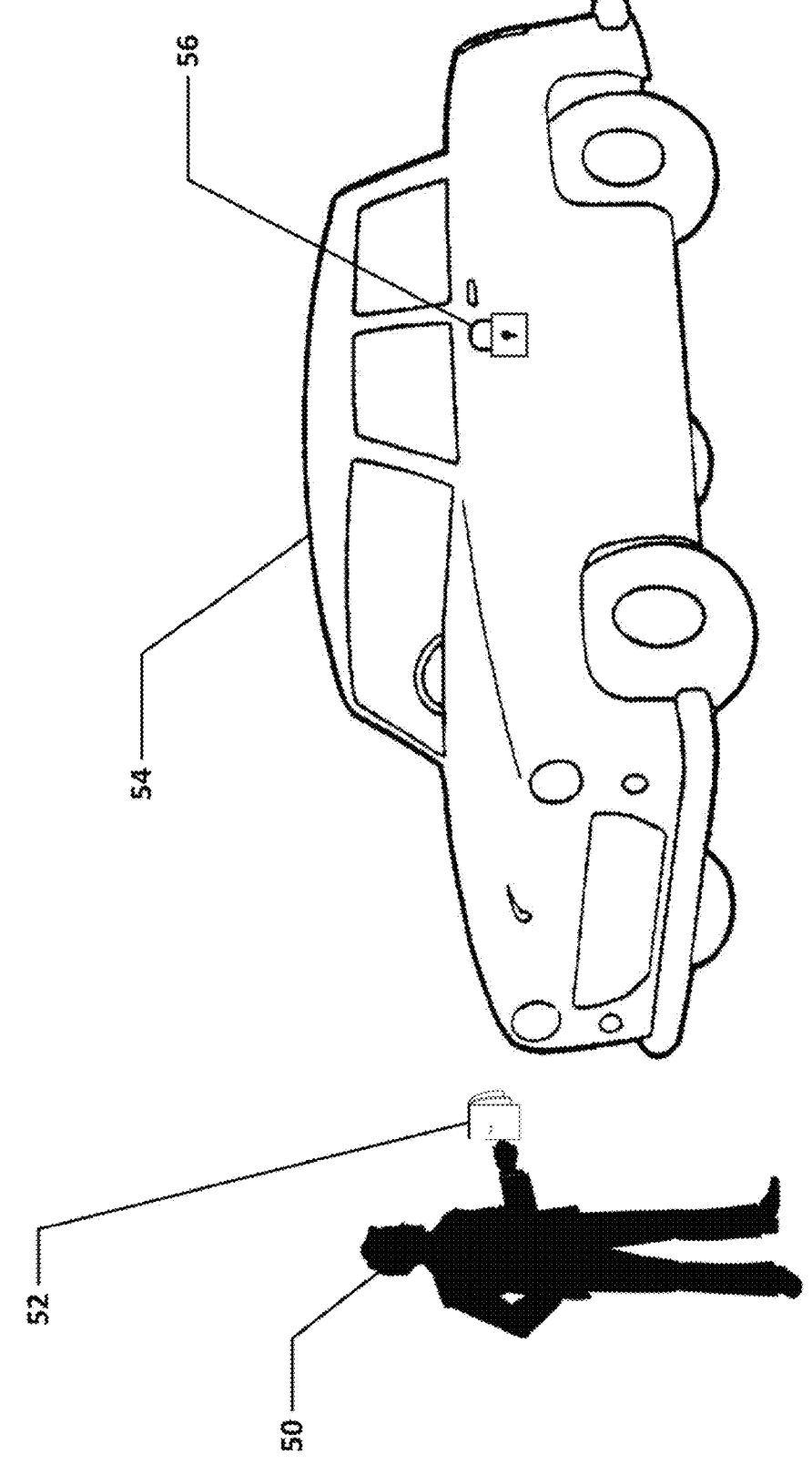
FIG. 5 illustrates access to a vehicle by a non-owner through the use of a remote access system.

FIG. 5 shows a vehicle 54 that is enabled to grant access to users 50 by way of a lock box 56 connected to a vehicle 54 entrance. Vehicles 54 with lock boxes 56 are typically made available to potential buyers of vehicles 54 that are for sale. Lock box 56 access systems are utilized in scenarios when a sales agent or other representative is not present at the vehicle 54 in order to grant access to the would-be buyer

50. Lock box 56 access is typically granted by having the user 50 enter an access code at the device 56, thus unlocking the compartment that contains the key or key fob to be utilized to unlock and operate the vehicle 54. User's 50 will typically write the access code on a piece of paper 52 or locate the access information in another less-than-secure manner. When vehicles 54 have multiple potential buyers 50, all entrants will typically utilize the same access code. The utilization of lock box 56 systems like that shown make the vehicle 54 vulnerable to theft or vandalism should the access code fall into the wrong hands. By utilizing a single access code for multiple users 50, the lock box 56 system makes it difficult to track which possessors of the code actually accessed the vehicle 54 and render any damages to the vehicle 54 untraceable.

Figure 6:
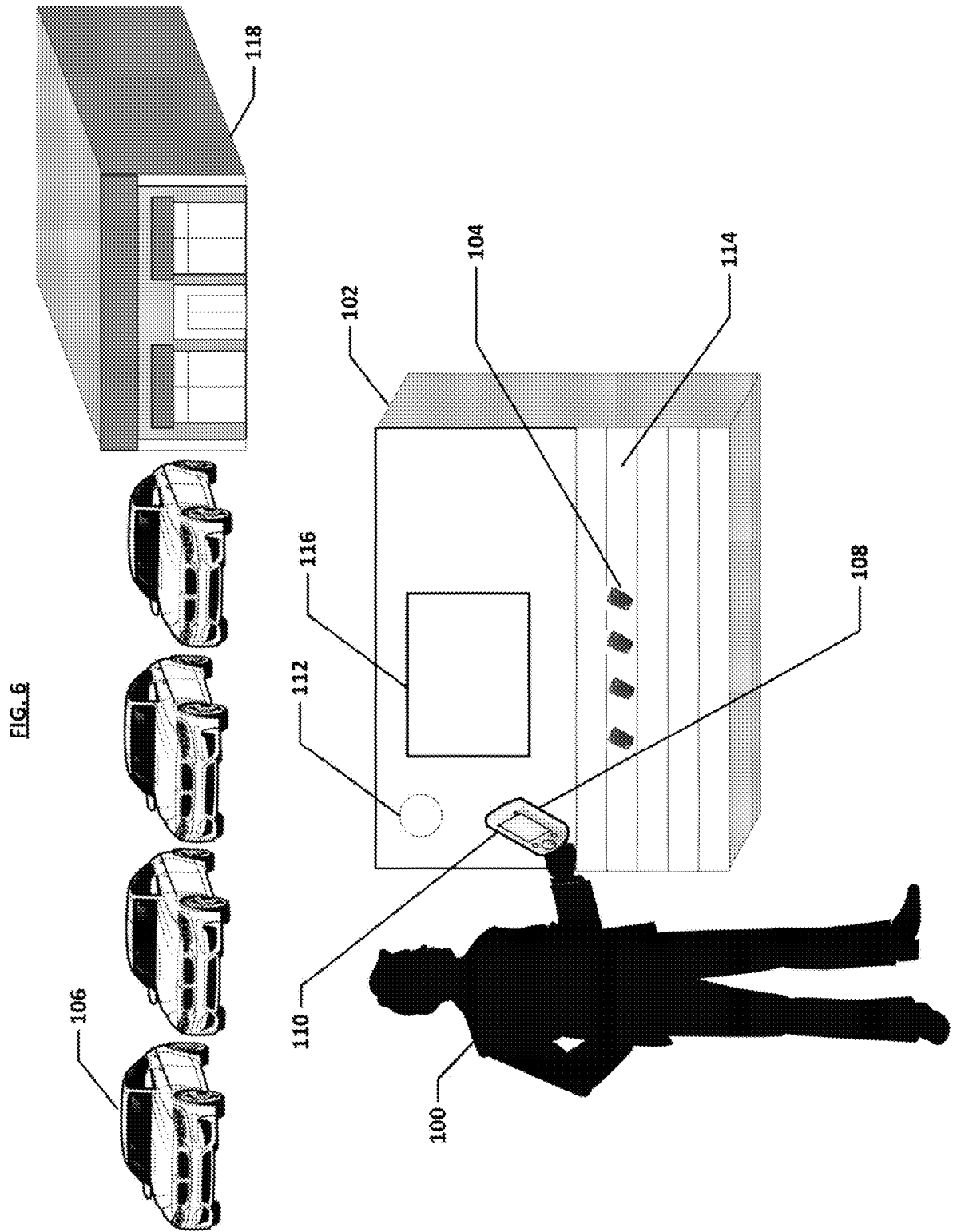
FIG. 6 illustrates a remote key fob access system transacted with a mobile communication device.

FIG. 6 shows a user 100 performing an on-site transaction with a system 102 in order to gain physical access to a key fob 104 that will be used to take possession of a physical asset 106. The user 100 presents a 2D code 108 to the system 102 by showing the screen of a mobile device 110 to the optical unit input 112 to the system 102. In various embodiments the asset access system 102 will contain multiple zones 114 that have covers or other actuated features to allow access to transacted assets. A screen 116 or other passive feedback device displays messages that communicate transaction details to the user 100. The facility shown may contain a physical structure 118 that houses logistics equipment and/or personnel utilized for the maintenance and management of the physical assets on site. The transaction of the user 100 with the asset system 102 does not require the presence of any personnel from the physical structure 118.

Upon completion of the presentation by the user 100 of the 2D code 108 on the screen of the mobile communication device 110 to the optical input unit 112, and upon the subsequent validation of the 2D code 108, the system 102 will actuate the appropriate entry to the access zone 114 that contains the asset 104 associated with the transaction. Upon the sensed removal of the asset 104 the system 102 will display the appropriate status message at the display 116 and complete the transaction by closing the access zone 114 that contained the asset.

The system 102 of FIG. 6 also facilitates the return of a physical asset 106 at the end of a term ownership, lease, rental or other temporary use or access. The return of an asset can occur at the same physical location where the transaction commenced or can occur at a separate location. In a return or transfer embodiment the asset 106 is placed in a pre-determined location at the facility or is returned to any available asset location at the facility. The user 100, with key fob 104 in hand, will present the appropriate 2D code 108 displayed on a mobile device 110 to the optical input unit 112 as a means to initiate the return transaction. Upon validation of the 2D code 108, the system 102 will actuate the appropriate access zone 114 to enable the user's 100 placement of the returned key fob 104 in the proper return location 114 in the system 102. The return system 102 will display 116 the successful completion of the return transaction and close the actuator for the access zone 114.

Figure 7:
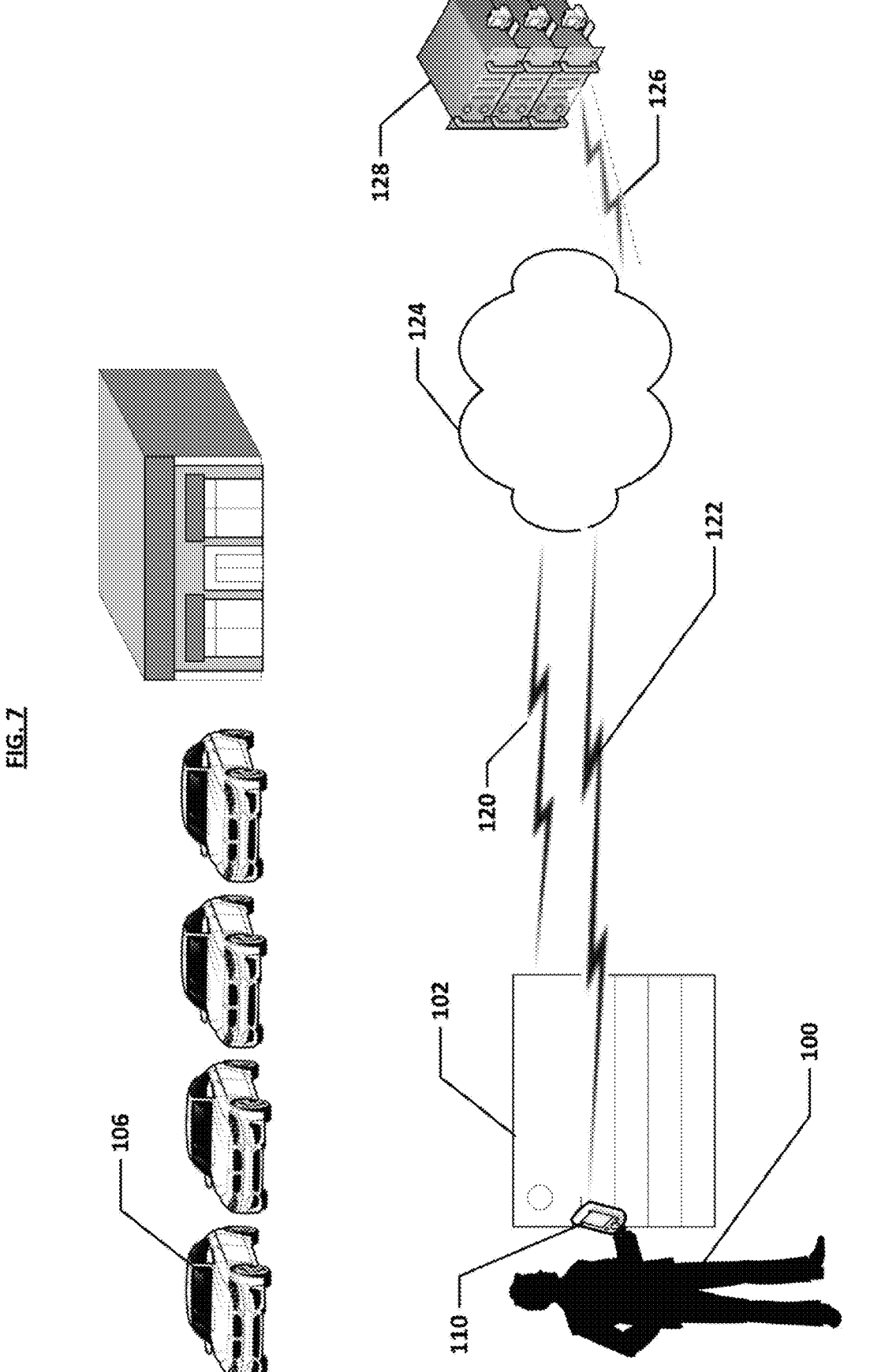
FIG. 7 illustrates access client communications for the remote key fob access system.

FIG. 7 shows the system 102 of FIG. 6 with the addition of communication channels. The mobile device 110 is typically connected via a wireless interface 122 whereby a transaction for the access to an asset 106 that has been negotiated previously or on-site has been completed. A transaction server 128 or other cloud-based or data center-resident computing platform negotiates the initial transaction and prepares the appropriate transaction data structure that will be used by the system 102 for the physical transfer of the asset 106. The transaction server 128 is connected to the Internet 124 or other communication protocol network via a two-way communication link 126. The on-site transaction system 102 communicates with the Internet 124 or other communication protocol network via a two-way communication link 120 that can be a wired, electrical, optical, or wireless connection.

Figure 8:
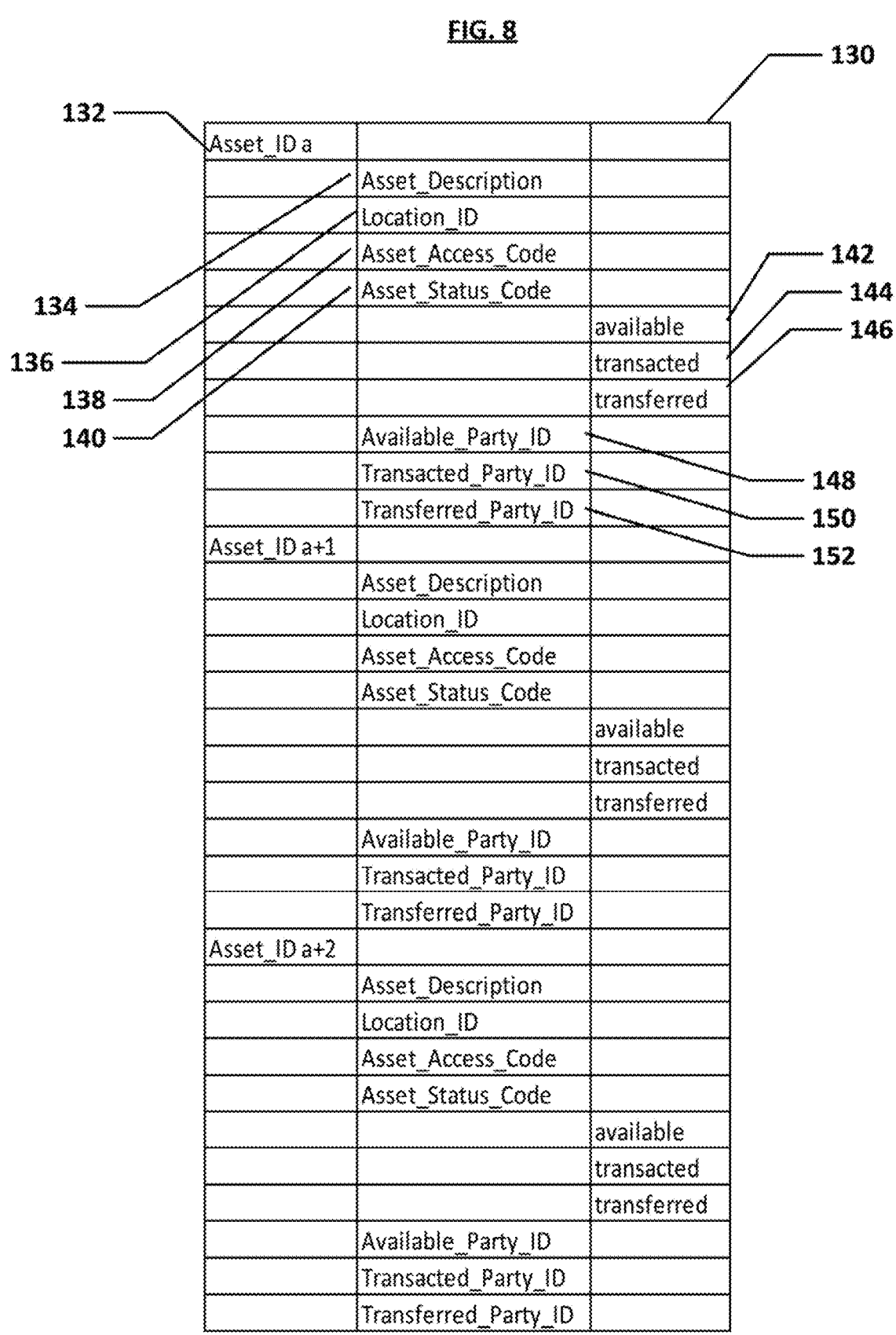
FIG. 8 illustrates a data structure for a remote asset access system.

FIG. 8 shows an embodiment of a transaction server data structure 130 for managing transactions in an asset access system. Data elements are stored and tracked according to Asset_IDs 132, which are unique identifiers for all of the assets available in the system. As Asset_ID can remain in effect for the life of an asset or new asset IDs can be established in order to have a unique asset ID for each asset for each transaction. The Asset_Description 134 field is an alphanumeric description of the asset and may contain many sub-fields for information that may include, but not be limited to, vehicle make, model, VIN, Stock Number, GVWR Manufacturer, Class, Drive, Invoice Price, MSRP, Body Type, Stock Image, Doors, Drivetrain, Engine Type, Fuel Type, Horsepower, NetTorque, Cylinders, Height, MPG (City), MPG (Highway), color, fuel-level, mileage, used, Base Curb Weight, Length, Overall, Service Tag. The Location_ID 136 field specifies information about where the asset presently resides. The Location_ID 136 may be a code for the location that references a look-up-table in the system, or the Location_ID may contain many sub-fields for information that may include, but not be limited to, city, state, address, stall number, GPS location, radius, companyID, tagID, reservedDate, kioskDate, onUserID, onKioskID, assetID, drawerTier, stockNumber, lastchange, lastKioskID, lastUserID, position_drawer, position_board, position_slot, gpsCounter, containerID, area, size. The Asset_Access_Code 138 field is used to store information that will be used to validate the 2D code used for system access.

The Asset_Status_Code 140 is a multi-state field that reflects the present status of the asset. When an asset is available for access, the Asset_Status_Code 140 state is set to "available" 142. The "available" 142 state is the initial status of the Asset_Status_Code 140 when a new Asset ID 132 is established in the system. When a user of the asset system negotiates access to a particular asset, the status change of the asset is reflected by updating the Asset_Status_Code 140 state to "transacted" 144. This change in status signifies that a user for the asset has been identified, the transaction has occurred, and the user is in possession of the 2D code that will be utilized to ultimately gain access to the asset. When a user of the asset system gains access to the designated asset, the status change of the asset is reflected by updating the Asset_Status_Code 140 state to "transferred" 146. This change in status signifies that a user is in possession of the physical asset.

Figure 9:
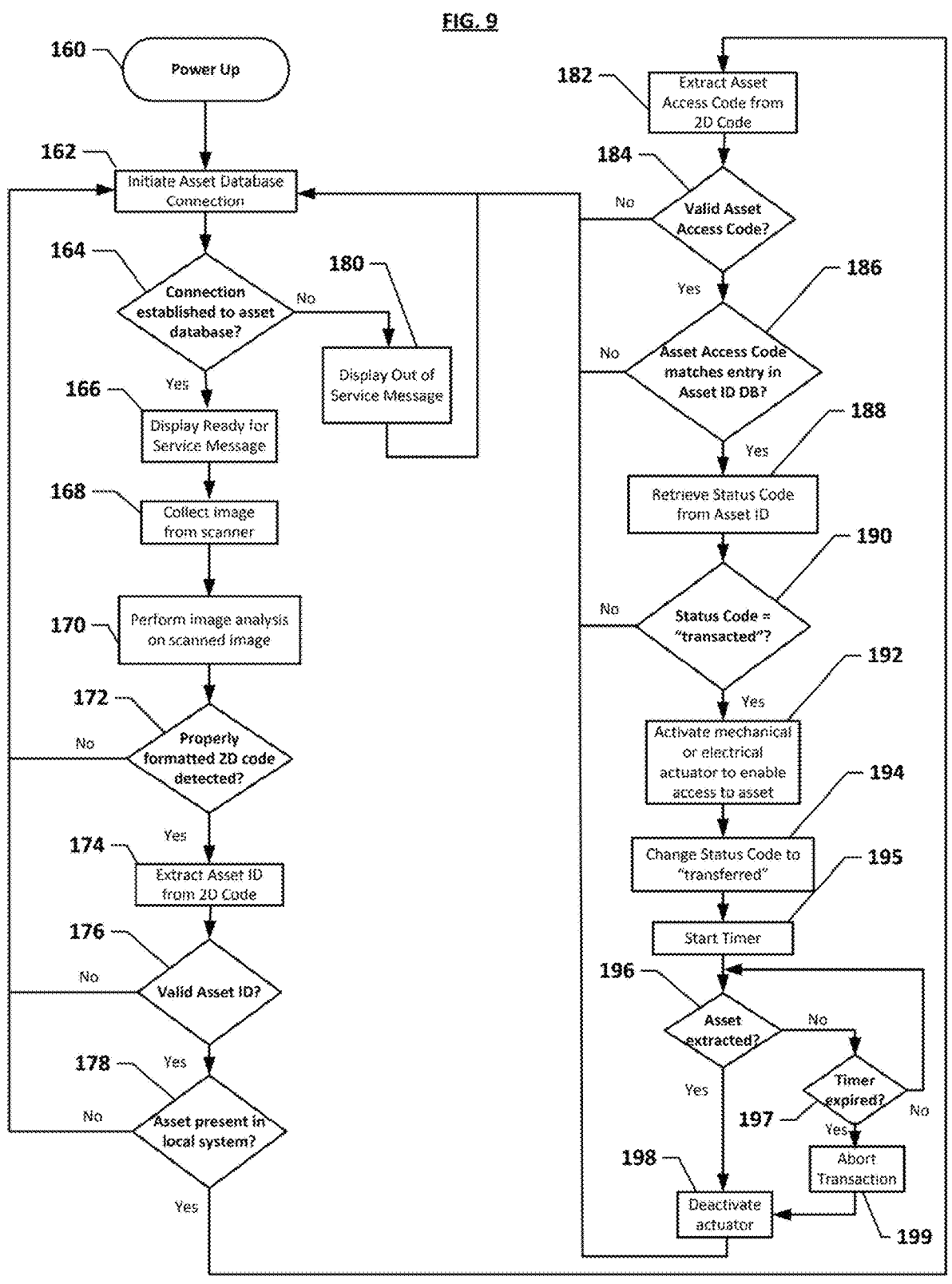
FIG. 9 illustrates a functional flowchart for a transaction with a remote asset access system.

FIG. 9 shows a functional flow chart for an embodiment of the asset access system. Upon Power Up 160 the system will Initiate a Connection to the Asset Database 162. The asset database may be resident on the client system or may be located on a system that includes, but is not limited to datacenters, server clusters, application servers, mainframe computers, laptop computers, notebook computers, tablet computers, cell phones, mobile hard drives, portable hard drives, USB jump drives, portable storage devices such as SD cards, micro SD cards, compact flash cards, cameras, security cameras, routers, switches, door locks, asset servers, i/o control panels, security control panels, device control panels, terminator boards, bank boards, key tags, key fobs, vehicle control systems, vehicle i/o systems, plane control boards, flight data recorders, spacecraft control systems, bank control systems. Failure by the system to properly connect to the asset database will prompt the system to display an Out of Service message 180. Upon establishment of a connection to the asset database 164, the system display may show a Ready for Service message 166 which signals to potential users that the system is ready to scan for valid codes. While in the Ready for Service state, the system will periodically collect an image from the scanner 168 and perform image analysis 170 on the scanned image. The image analysis 170 may be specific to the type of code utilized by the system. Type of information used by the scanner and analysis software may include, but is not limited to, QR code, Aztec Code, Code 1, Color Code, Color Construct Code, CrontoSign, CyberCode, DataGlyphs, Data Matrix, Datastrip Code, digital paper, EZcode, High Capacity Color Barcode, Han Xin Barcode, HueCode, InterCode, MaxiCode, MMCC, NexCode, PDF417, Qode, Shot Code, Snap Code, SparQ Code, Voice Eye. If the analysis software does not locate a properly formatted code 172, the system will return to the processing step following Power Up 160.

Upon detecting a properly formatted code 172, the system will parse the information within the code and will extract the Asset ID 176. If the Asset ID is not valid the system will return to start up. If the Asset ID is valid the system will check to see if the asset is present in the local system 178. Having verified that the asset is local, the system will extract an access code from the 2D code 182 as a means of further validating the transaction. When a valid access code is detected 184 the system will check to see if the access code matches the access code that is in the database for this particular asset ID 186.

The processing system of an embodiment, having validated the codes for the transaction, will next validate the status of the asset to ensure its worthiness for transaction. The system retrieves the status code from the Asset_ID field 188 and ensures that the status is "transacted" 190. The system will make the asset available to the user by activating 192 a mechanical or electrical actuator to enable access to the asset and change the status code to "transferred". The system will wait a time to validate the asset was transferred. The wait period will commence when the system starts a timer 195 that will be used to define the wait period. If the asset is extracted 196, the actuator is deactivated 198 and the system returns to initiate another possible transaction. If the wait timer expires 197 the transaction is aborted 199 without the asset changing possession.

The flowchart of FIG. 9 shows essential elements of an embodiment. Persons skilled in the art can construe versions of embodiments that do not contain all of the features of FIG. 9. Alternate embodiments are achieved while remaining within the scope of inventions by including only the necessary steps to achieve the results disclosed within.

Figure 10:
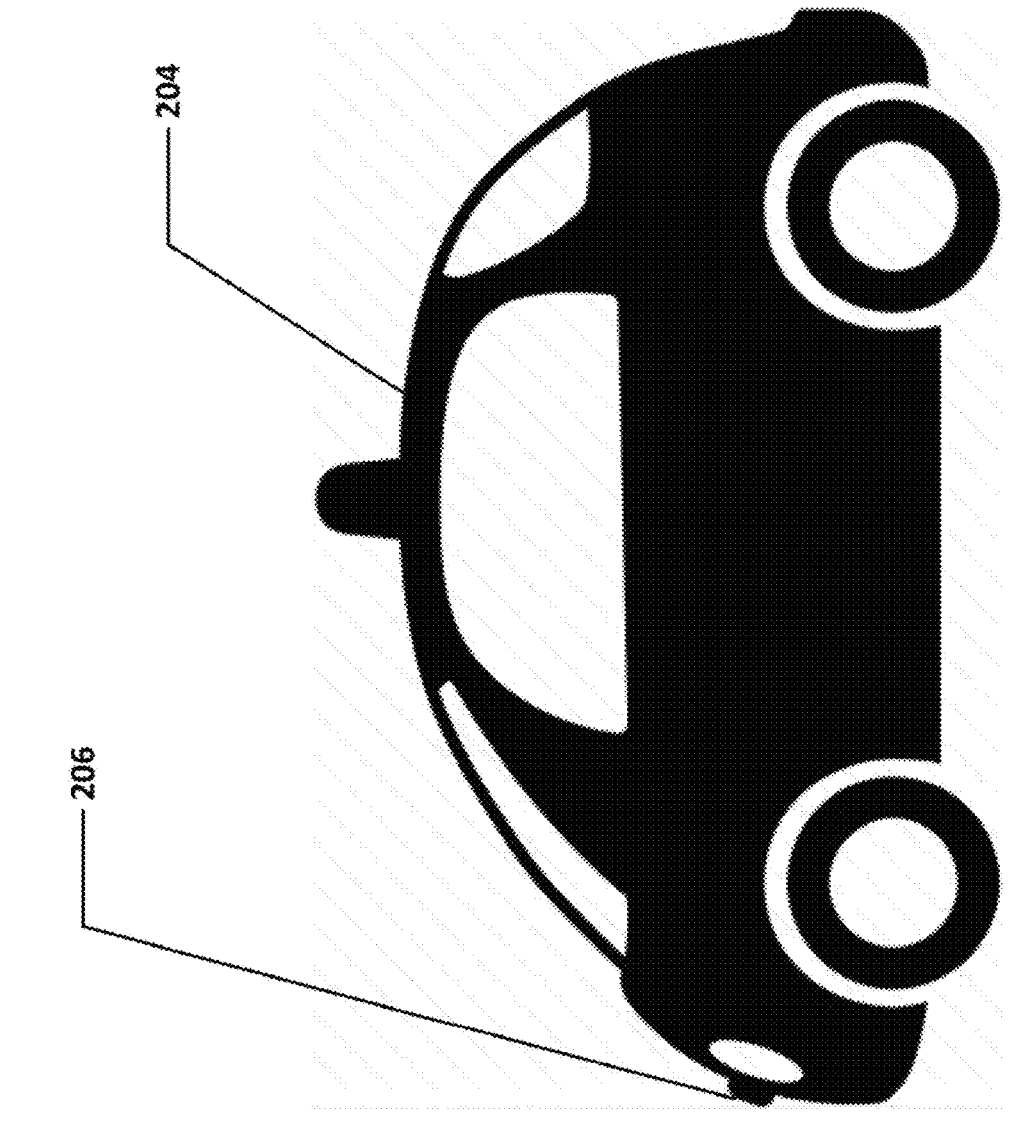
FIG. 10 illustrates remote access to a driverless vehicle using a mobile device.
Figure 10:
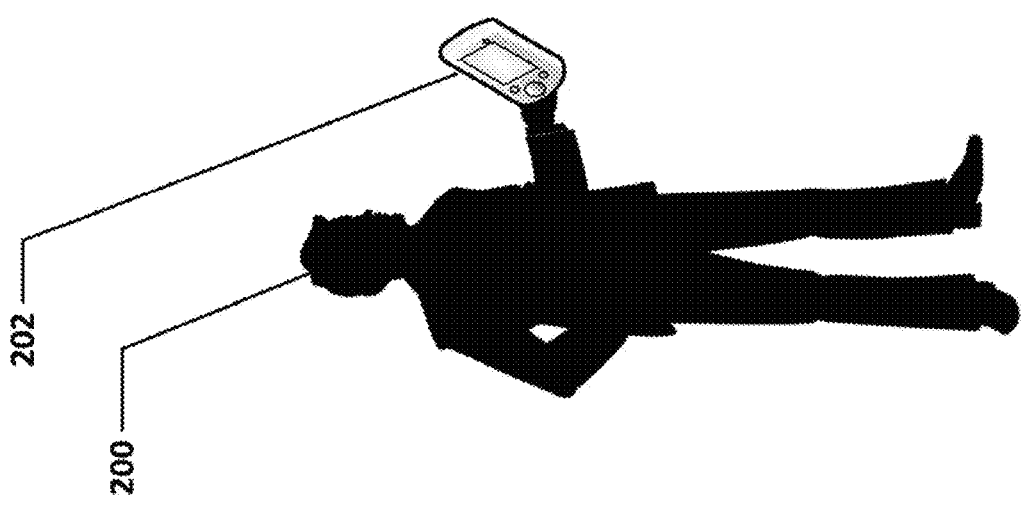

FIG. 10 shows an embodiment for a mobility service user 200 accessing a scheduled ride in a driverless vehicle 204. Upon arrival the vehicle 204 will present its scanner 206 to the environment at the designated location. The user 200 will show the screen of a mobile device 202 to the vehicle 204 scanner 206. The screen of the mobile device 202 will display the previously-distributed code that was sent to the user 200 by the transaction system. Having validated the transaction, the vehicle 204 will grant internal access to the user 200 and transport the user 200 to the pre-determined destination.

Figure 11:
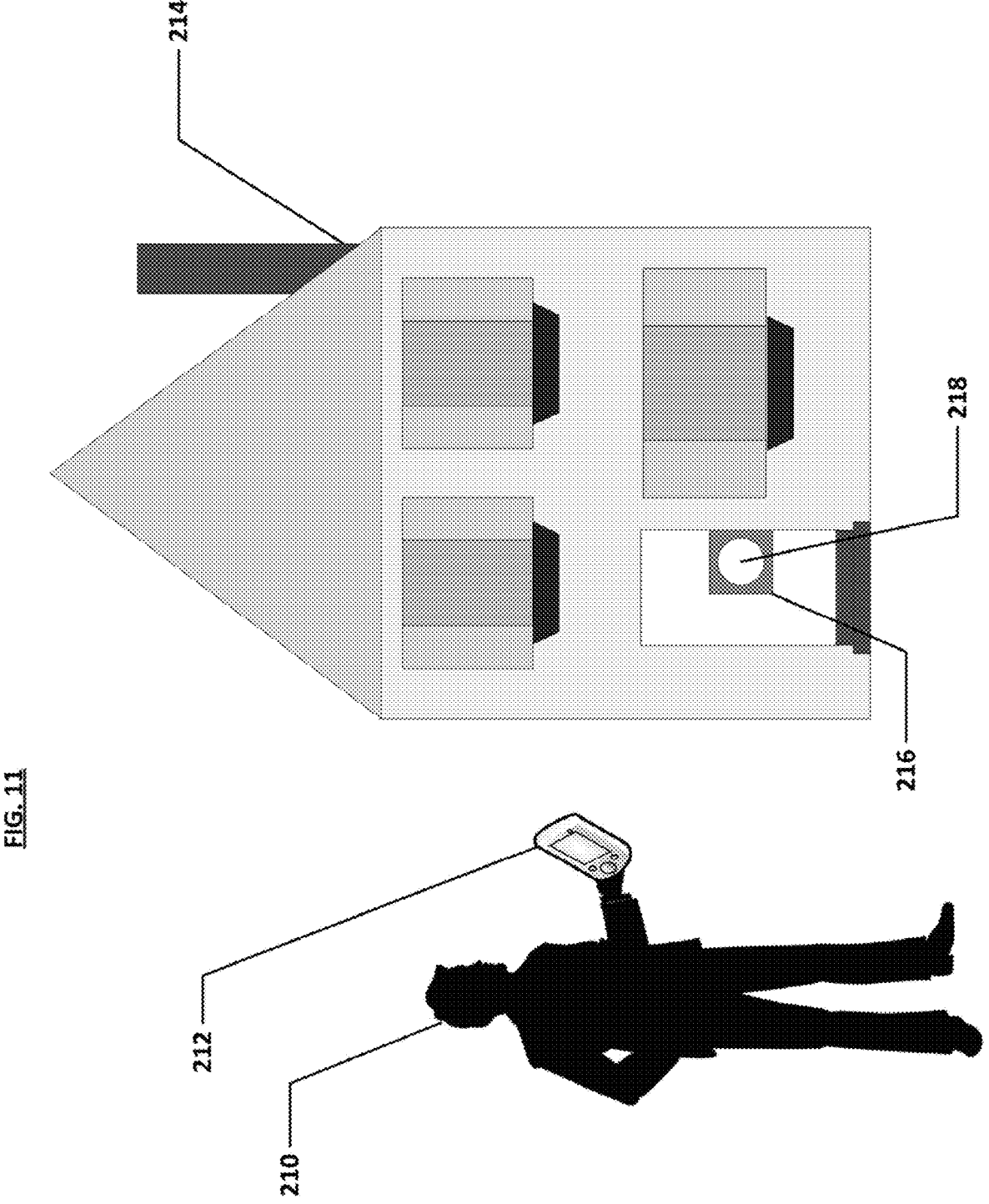
FIG. 11 illustrates remote access to real estate using a mobile device.

FIG. 11 shows an embodiment for a temporary user 210 of a property 214. The user 210 may be a temporary renter, a viewer of for-sale property, a customer of a time-share arrangement, or any other human that has pre-negotiated access credentials to the property 214. The user 210 will show a code displayed on the screen of a mobile device 212 to the scanner 218 portion of the access control module 216. The module 216 will grant access to the property or will grant access to a key or key code that will enable access to the property.

Figure 12:
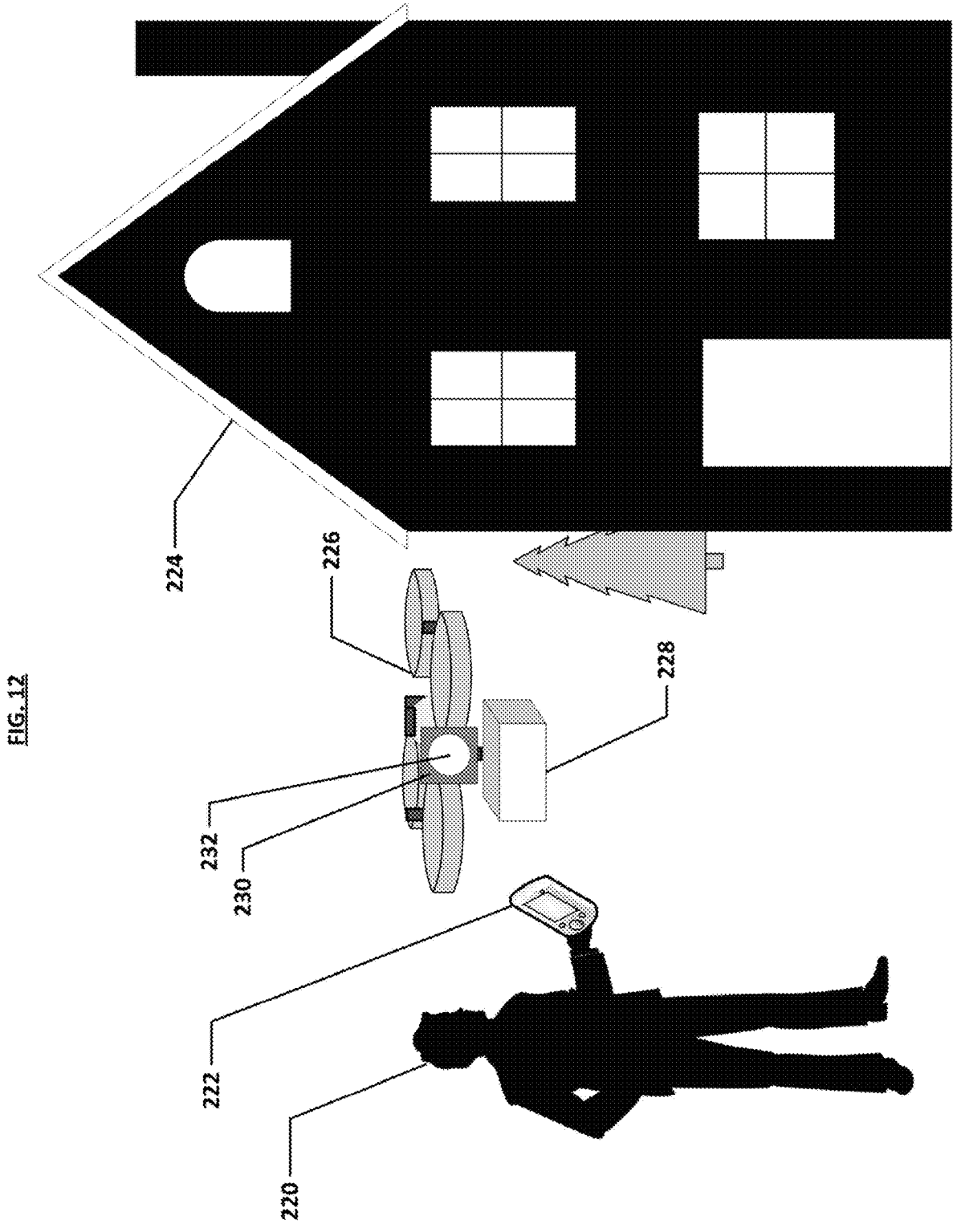
FIG. 12 illustrates a package delivery transaction using a mobile device.

FIG. 12 shows an embodiment that facilitates the receipt of a package 228 delivered by a UAV 226, whereby the UAV 226 must validate the transfer of possession of the package 228 as an alternative to gathering a signature of receipt directly from a human. As the UAV 226 nears the designated drop zone it enables it scanner 232 on the asset access module 230 to locate and validate a proper code. The UAV 326 will leave the package 228 at the designated location and return to its port. A human-less embodiment of FIG. 12 would remove the need for user 220 presence by having the user 220 print the transaction code on, for example, a sheet of paper. The user 220 could place the sheet of paper at the designated delivery location. The UAV 226, upon reaching the designated delivery zone, would validate the information on the paper, leave the package 226, and return to port.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. An access system configured to enable a transaction in which a user gains access to a physical asset upon the presentation of a unique code, said unique code containing information to access the asset and identify the physical asset the access system comprising:

an asset identification system wherein each of the one or more assets has an asset ID code;

an asset housing having one or more actuated features configured to provide selective access to one or more assets securely housed within the housing, the housing including an optical unit configured to receive a unique code presented by the user;

a computing platform configured to (i) validate the unique code received by the optical unit, (ii) extract the asset ID code from the unique code identifying at least one of the one or more assets securely housed within the housing, and (iii) actuate at least one of the one or more actuated features corresponding to the at least one asset identified by the asset ID code, thereby permitting selective access to the at least one asset;

a sensor configured to sense the removal of the at least one asset;

a display screen configured to display details of the transaction to the user; and a second unique code for access to the housing for the return of the asset, wherein a timer is triggered by the access ID code and then controls the amount of time in which the housing is opened for accessing and returning assets.

2. The access system of claim 1 whereby the asset is a key that provides access to another asset.

3. The access system of claim 1 wherein the unique code is a two dimensional code.

* * * * *